INVENTORS.
HERMAN FREDRIK VILHELM BÖDCHER.
ERIK JOHAN VON HEIDENSTAM.
by Sommers & Young
Attorneys

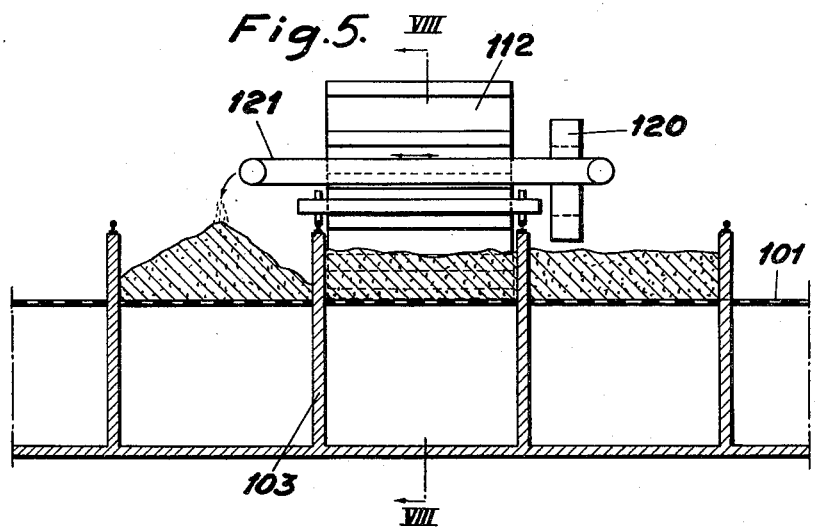
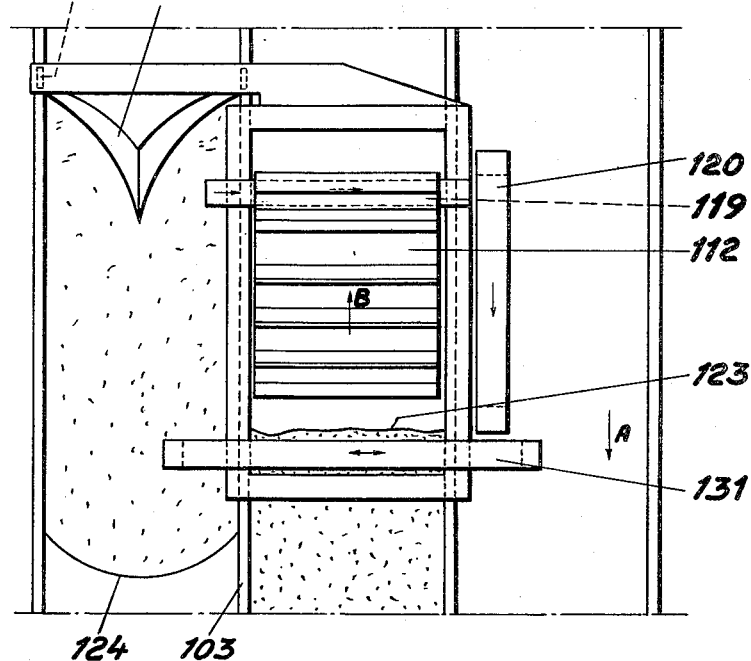

Patented Mar. 20, 1951

2,545,542

UNITED STATES PATENT OFFICE 2,545,542

MALTING PLANT AND METHOD IN WHICH THE GRAIN IS SUCCESSIVELY MOVED AND AERATED DURING MALTING

Herman Fredrik Vilhelm Bödcher and Erik Johan von Heidenstam, Stockholm, Sweden

Application March 6, 1946, Serial No. 652,298

2 Claims. (Cl. 195—129)

This invention refers to a plant and a method of malting.

The chief purpose of this invention is to increase the efficiency of the malting process. The system according to this invention retains the best features of the older malting systems and simultaneously presents several advantages that are not known in any other malting system or in any combination of older malting systems.

Another advantage of this invention is that it requires an absolute minimum of installation and equipment.

In contrast to all prior malting plants (including Saladin malting plants) the present system only needs devices for removing the (finished) malt from one single chamber of a number of such chambers.

In all other plants, including malting plants of the Saladin system, special devices, like dragging buckets, are necessary for emptying the chambers and other devices for agitating the grain (barley corn) in each chamber. Another purpose of this invention is to use one and the same mechanism both for emptying the chambers and for agitating the grain, said mechanism being movable from chamber to chamber. It is observed that this mechanism is used for transporting the grain under malting from one chamber to the adjacent chamber.

Another feature of the invention is that the grain is moved from chamber to chamber during the malting process, the air, moisture and temperature conditions being substantially constant in the same chamber, but differing from chamber to chamber.

Another feature of this invention is that the necessary mechanical equipment is simple, rational, inexpensive, and easy to operate. Nevertheless it eliminates practically all manual labor.

Another feature of this invention is that all the chambers (boxes) may be cleansed daily; because normally each chamber of the plant is emptied at least once daily, this being in sharp contrast to every older plant, including the Saladin system plants.

Another purpose of this invention is to reduce the necessary corps and supervision of the plant to a minimum. While, for instance, in a Saladin plant the supply of air to each of the chambers must be adjusted daily in accordance with the successive development of the grain in the chamber the supply of air to the separate chambers of the present plant may remain constant, as long as the same type of grain (barley corn) is being malted; the valves for controlling the supply of air to the individual chambers may thus be permanently set for the greater part of the year. In the present plant, any chamber always contains grain of the same malting age, that is in the same stage of development, while in the plants heretofore known the grain remains in the same chamber from the first day of its development to the last day. In the present plant the grain is successively moved from chamber to chamber, once or more daily.

Other purposes will be evident from the following specification and claims.

Our invention is illustrated in the annexed drawings, by way of example.

Fig. 5 shows a vertical section—analogous to Fig. 4—through another embodiment; Fig. 5 is a section on the line VII—VII in Fig. 6.

Fig. 7 shows a plan view of the parts illustrated in Figs. 5 and 6.

Figure 1:
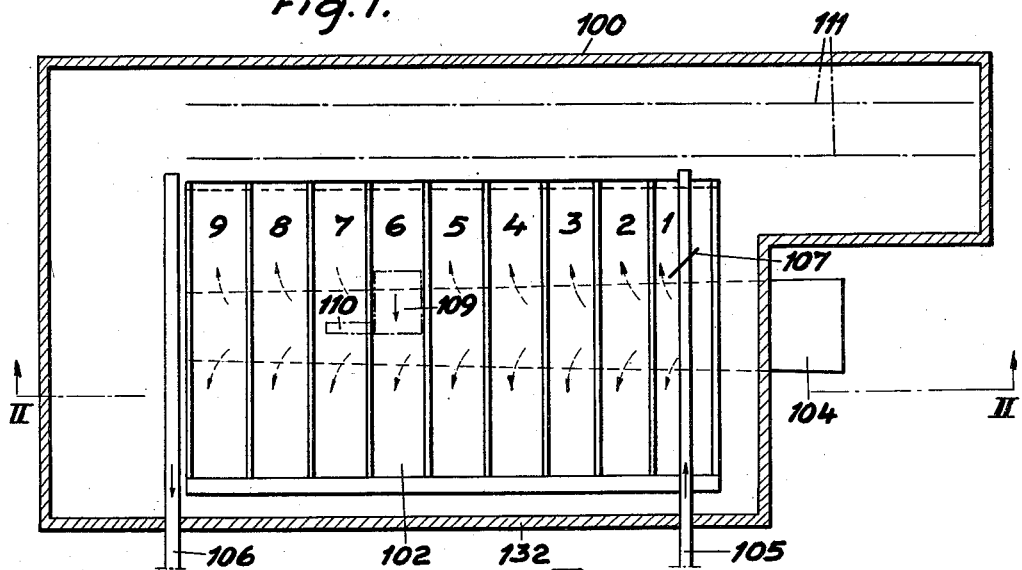
Fig. 1 shows a plan view of a malting plant in accordance with the invention, the roof being cut away to show the malting floor.
Figure 2:
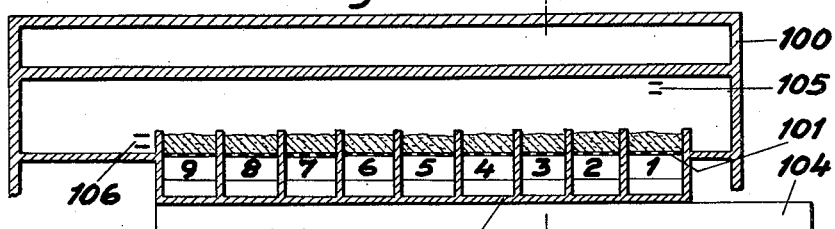
Fig. 2 shows a longitudinal section on the line II—II in Fig. 1.
Figure 3:
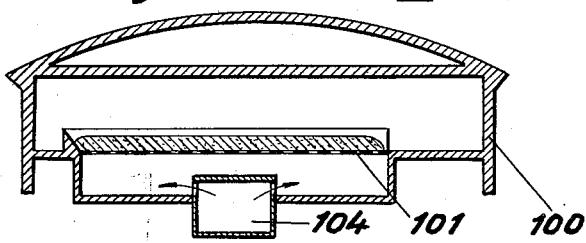
Fig. 3 shows a transverse section on the line III—III in Fig. 2.

Referring now to Figs. 1–3 of the drawings, the numeral 100 indicates a malting house. The malting floor therein is made of perforated sheet metal 101 and is divided into a number of compartments 102 by a number of low walls 103 carrying rails 108 along their upper sides. Into said compartments conditioned air is supplied from below through a channel 104 and passes through the perforated floor 101 from below upwards.

Steeped grain is supplied by any suitable device, such as a belt conveyer 105 to the first compartment 1. A movable shield 107 serves for moving the steeped grain off said conveyer for spreading it over the whole compartment. In the embodiment shown, it is presumed that the malting procedure requires 8 days=8 times 24 hours, so that the grain remains about 24 hours in each compartment. The number of compartments is nine, and they are numbered 1, 2 ... 9, beginning from the inlet end. From the outlet end the ready-malted grain is discharged by suitable means, such as a conveyer 106.

On the rails 108 on the tops of the walls 103 a car 109 is movable, which carries a malt turning device. Note is taken of disclosures in our co-pending U. S. applications No. 530,920, now abandoned, and No. 648,521, now abandoned. Thus, it may consist of a bucket conveyer for lifting the grain from the floor. This conveyer discharges the grain on a chute 110 and from it the grain falls down into the next compartment. The car 109 is transferable from the rails 108 to a pair of longitudinal rails 111, on which the car is movable from one compartment to another.

The plant described is operated as follows:

Steeped grain is supplied to the compartment 1, say once in 24 hours. After this grain has been left there for (say) 24 hours, the car 109 is driven through the compartment 1 and lifts the grain therein and discharges it into the chamber 2. After the compartment 1 has thus been emptied it may be cleansed by suitable means, and is then filled again with steeped grain from the conveyor 105.

After still 24 hours the grain in the compartment 2 is discharged into the compartment 3, and then the grain in the compartment 1 is transferred into the chamber 2. Thus the procedure is continued: The grain under malting is moved from chamber to chamber, and passes successively from the chamber 1 to the chamber 9 and is finally discharged on the conveyor 106 which transports the ready malted grain to a kiln. When a chamber is empty, it may easily be cleansed before it is filled with grain again.

Just as described in our said co-pending U. S. patent applications, the grain in the compartments 1—9 are in various, successive stages of malting, the almost unfermented, undeveloped grain being in the first compartment 1. The grain in the compartment 2 is more fermented and the grain in the compartment 3 is still more fermented and developed etc. Thus, batches of grain in successive stages of fermenting are simultaneously in the various compartments 1—9, when the malting house is in continuous operation. Each day, the car 109 begins working in the compartment 9, which it empties. Then the car is moved to the compartment 8 for discharging its contents into the emptied compartment 9. Thereafter the car is moved to the compartment 7 etc., until it has worked through all the compartments. Then the work begins once more in compartment 9. Or: the works begins once more in compartment 2, and is continued, until all batches have been moved back one step. Then the work begins in compartment 9 over again.

It is to be observed that after a compartment, say compartment 5, has been emptied, it is possible to effect an extra aeration and turning in (say) compartments 3 and 4 in the following manner: By means of the car 109 the grain in the compartment 4 is transferred to the compartment 5, and the grain in the compartment 3 is discharged into the compartment 4, leaving the compartment 3 empty. After a suitable period of time, the grain in the compartment 4 is now moved back into the compartment 3, and thereafter the grain in the compartment 5 is moved back into the compartment 4. After another suitable interval, the grain in the compartment 4 is transferred into the compartment 5, and the grain in the compartment 3 is conveyed into the compartment 4; thereafter the grain in the compartment 2 is transferred into the compartment 3 etc. Evidently this implies, that in an operation, the grain in the compartments 3 and 4 has been aerated and turned more than the grain in the other compartments. This renders it possible to modify the malting process and to adapt it very well to the desired conditions.

Of course, shutters or valves may be used for controlling the supply of air from the channel 104 to the various compartments 1—9. Thus, the quantity of air passing through each compartment may be controlled individually, rendering it possible to control the various stages of the malting process individually.

Rails like 111 may be provided along both sides of the malting house, to render it possible to introduce the car 109 from one end or the other into the compartments 1—9.

Figure 4:
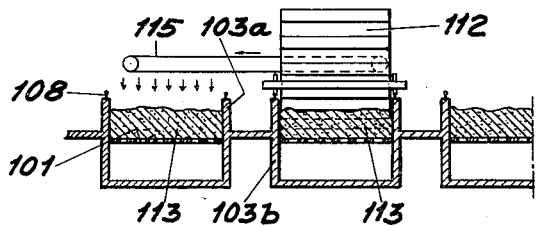
Fig. 4 shows—on a larger scale—a vertical section through a modified embodiment.

Fig. 4 shows a simple and efficient turning and conveying mechanism, for turning the grain under malting and for conveying it from one chamber to another.

On the car 109 there is a bucket conveyor 112. This conveyor takes the grain 113 from the batch on the floor of the compartment and discharges it (via a hopper 114) on to a belt conveyor 115, from which the grain is swept off by a number of shields or plates 116 to fall down into the compartment adjacent to that in which the conveyor 112 operates.

If the conveyor aggregate 112, 115 shall transfer the grain back to a compartment of a lower number (say from compartment 4 to compartment 3), it is necessary to take out the car 109 on a turntable and turn it 180°.

Reference is made to the fact that the "front lines" 117, 118 of the grain in the two adjacent compartments are displaced a considerable distance in relation to each other (counting in the direction of motion of the car 109 in the compartment). The direction of rotation of the belt conveyor 115 should be reversible at will, and said conveyor should also be movable so as to project from the car 109 on one side or the other, as may be necessary to adapt the aggregate to the working conditions in every particular case.

Figure 6:
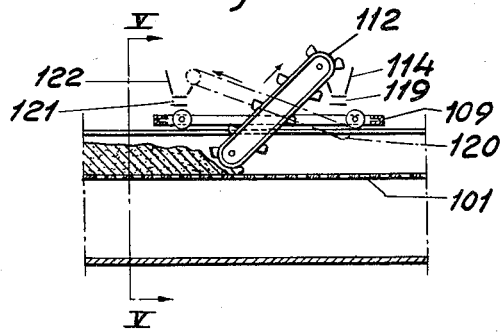
Fig. 6 shows a vertical section on the line VIII—VIII in Fig. 5.
Figure 8:
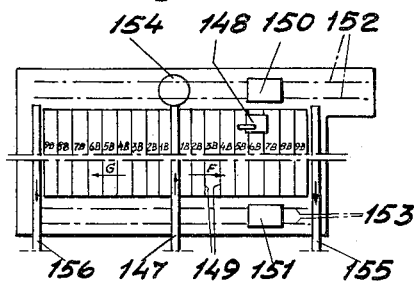
Fig. 8 shows a plan view of a malting plant, in which the steeped grain is supplied in the centre and is moved towards both ends.

The turning and conveying aggregate shown in Figs. 5–7 is slightly more complicated than that shown in Fig. 4 but it has additional advantages in operation. In Figs. 5–7 the car 109 carries a bucket conveyor 112 lifting the grain from the malting floor 101 and discharging it into a hopper 114 on the car. The conveyor 112 may be slanting, as shown in Fig. 8, but it may also be vertical. From the hopper 114 the grain is discharged on a belt conveyor 120, which delivers the grain on to another belt conveyor 121 which is slanting in relation to a horizontal plane. From that second conveyor the grain is discharged on a belt conveyor 121, via a hopper 122. The two conveyors 119, 121 are substantially at right angles to the conveyor 120, and are on opposite sides of the bucket conveyor 112. The belt conveyor 121, whose direction of rotation, preferably, is deversible at will, transports the grain to either of the compartments adjacent to that in which the car 109 moves. Reference is made to the fact that the "front lines" 123 and 124 of the batches of grain in adjacent chambers are very near to each other, counting in the direction A of motion of the car 109 in the compartment. This means that the capacity of the floor 101 can be utilized more efficiently. The partial movements of the grain from one compartment to an adjacent one render a result practically equivalent to a motion of the grain only in the direction at right angles to the wall 103, without any displacement in the longitudinal direction of said wall.

To distribute the grain discharged from the conveyor 121, to a layer of uniform height, a plow 125 is mounted on a car 126. The car 126 is coupled to the car 109 in the adjacent chamber and is thus moved in the direction of the arrow A to cause the plow 125 to sweep off the top of the "hill" of grain. Behind the plow the upper surface of the grain is plane and levelled.

In Fig. 4 there are double walls 103a, 103b between two adjacent compartments but in accordance with Fig. 5 one single wall separates two adjacent compartments, which means a better economy of space and of erection costs. The wall 103 in Fig. 5 may carry one single rail or double parallel rails. The plow 125 may be carried by a girder or framework rigidly secured to the car 109; in such case the car 126 may be dispensed with. It is also possible to disconnect the car 126 from the car 109 and to drive the car 126 individually, for its grain levelling action.

It might be mentioned here that the plant shown in Figs. 1–3 may be enlarged to a greater capacity, at very low costs. For this reason, it is only necessary to remove the wall 132 and to extend the compartments 102 in their longitudinal direction. Even after such re-construction, the whole plant may be operated by means of the same turning conveyor, like 109, 110. If the compartments 102 are extended, say, to three times their original length shown in Fig. 1, the capacity of the plant is also increased three times, and still the same original machine equipment suffices. This means that the plant can be adapted to increases in capacity, at a minimum additional cost. It is, of course, also possible to double the plant shown in Fig. 1 by arranging a new set of compartments like 102 on the opposite side of the rails 111; also these additional chambers may be operated by means of the same machine equipment.

One (or more) additional conveyor aggregates, may also be used in the same plant.

As was mentioned above, the minimum number of compartments is determined by the number of successive stages of malting. As an example, if the whole malting process for a batch of grain requires 8 days =8 times 24 hours, from the moment in which the steeped grain enters the malting plant, to that moment in which the ready-malted grain is discharged therefrom, it is suitable to have at least eight compartments each holding a batch of grain, the difference of malting age of two adjacent batches simultaneously in the plant being 24 hours. In other words, each batch has been malted 24 hours longer than the foregoing one in the next foregoing compartment. In an 8 day scheme, it is also possible to use 16 compartments, or any other suitable multiple of 8 compartments. As mentioned above, it is suitable to provide one or more "supernumerary," additional chambers. Thus, instead of having 8 compartments, it is preferred to have 9 or 10 compartments. As indicated above, these additional compartments may be used for aerating the middle batches more frequently than the other ones. In some cases, this is advantageous for increasing the quantitative and qualitative result of the malting operation. Some suitable time schemes for the malting are disclosed in our said three copending U. S. patent applications, and may be applied here also.

The arrangements described above in connection with Figs. 1–8 are suitable for use in malting plants in which the roof is self-supporting and does not rest on pillars standing on the floor. Generally, this is the best arrangement. But in some cases, this invention is used for modernizing malting houses having the roof supported by pillars resting on the floor.

Fig. 8 shows an embodiment, in which the steeped grain supplied by a belt conveyor 147 is discharged to either side into two different compartments 1A and 1B. A conveyor car unit 148 runs on rails 149 on the walls between the compartments and may be transferred to a car 150 or 151. The car 150 runs on rails 152 and the car 151 on rails 153. A turntable 154 is provided for rendering its possible to swing the conveyor car unit 180°, if desired.

By means of the conveyor unit the batch of grain delivered into the compartment 1A is successively conveyed in the direction of the arrow F and passes successively into the compartments 2A, 3A . . . 10A, substantially as described above. Similarly, the batch in the compartment 1B is moved in the direction of the arrow G and passes successively through the compartments 2B, 3B . . . 10B. The finished malt is discharged on the belt conveyors 155, 156 which transport the malt to the kiln.

It may be pointed out here that, among other things, this invention renders it possible to have the various batches of grain in various stages of fermentation separated by walls, thus rendering all intermixing of batches impossible. The invention also renders it possible to cleanse the compartments thoroughly, when they are empty, which occurs at regular intervals during the continuous operation of the plant. The invention also renders it possible to aerate and agitate (turn) batches in certain stages of fermentation more frequently than the other batches.

Stress is laid upon the fact that the quality of air supplied per unit of time to each compartment below the perforated malting floor may be controlled individually for each compartment. The supply of air to that or those compartments which are just being filled or emptied can be cut off individually at will. For this purpose the air inlets to the different compartments are provided with individual control valves. The chute 110 can be disconnected.

What we claim is:

1. In a malting plant, in combination, a big room, in said room a row of parallel malting compartments separated by low walls and having a perforated floor, there being no pillars in said room between and along said compartments, means for passing air through the perforations in said floor and the grain malting thereon in said compartments, means for individually controlling the supply of air to each compartment, a device for supplying steeped grain to one of said compartments, a device for transporting the finished malt discharged from another of said compartments, said last-mentioned compartment being the outlet compartment, a conveyor with buckets extending across the whole width of a compartment and operable to take the grain from one compartment and discharge it into the next compartment or onto said transporting device without any displacement in the longitudinal direction of the compartments, said conveyer being movable along each of said compartments individually, and means for moving said conveyer from one compartment to any other of said compartments, including said outlet compartment, in which said conveyer is operable to discharge the finished malt on to said transporting device.

2. A method of malting grain, on a stationary perforated malting floor, divided into parallel malting compartments by low walls, comprising in combination, supplying steeped grain to an inlet compartment in said floor, discharging the finished malt from another, outlet compartment on said floor, pressing air from below upwards through said malting grain in the compartments, controlling the supply of air and also the condition of that air individually in said compartments, moving said grain from said inlet compartment successively and intermittently from compartment to compartment, until it reaches said outlet compartment without any displacement in the longitudinal direction of the compartments while emptying the whole contents of one compartment into an adjacent compartment.

HERMAN FREDRIK VILHELM BÖDCHER.
ERIK JOHAN von HEIDENSTAM.

REFERENCES CITED

The following references are of record in the file of this patent:

UNITED STATES PATENTS

| Number | Name | Date |
|---|---|---|
| 247,504 | Lederle | Sept. 27, 1881 |
| 412,701 | Engelhardt | Oct. 8, 1889 |
| 549,176 | Will | Nov. 5, 1895 |
| 582,327 | Theurer et al. | May 11, 1897 |
| 606,586 | Saladin | June 28, 1898 |
| 743,810 | Berg | Nov. 10, 1903 |
| 1,027,669 | Richards | May 28, 1912 |
| 1,258,299 | Bayley | Mar. 5, 1918 |
| 1,783,823 | Brodt | Dec. 2, 1920 |
| 1,827,358 | Giletti | Oct. 13, 1931 |
| 1,971,852 | Goebels | Aug. 28, 1934 |